United States Patent
Yau

(10) Patent No.: US 10,159,127 B2
(45) Date of Patent: Dec. 18, 2018

(54) LOW VOLTAGE DIRECT CURRENT LIGHTING SYSTEM HAVING IDENTIFICATION ADDRESSES

(71) Applicant: Delight Innovative Technologies Limited, Admiralty, Hong Kong (CN)

(72) Inventor: Kinhing Yau, Hong Kong (CN)

(*) Notice: Subject to any disclaimer, the term of this patent is extended or adjusted under 35 U.S.C. 154(b) by 0 days.

(21) Appl. No.: 15/522,374

(22) PCT Filed: Oct. 30, 2015

(86) PCT No.: PCT/CN2015/093426
§ 371 (c)(1),
(2) Date: Apr. 27, 2017

(87) PCT Pub. No.: WO2016/066138
PCT Pub. Date: May 6, 2016

(65) Prior Publication Data
US 2017/0318640 A1    Nov. 2, 2017

(30) Foreign Application Priority Data

Oct. 30, 2014 (CN) .......................... 2014 1 0596689

(51) Int. Cl.
| | |
|---|---|
| H05B 33/08 | (2006.01) |
| H05B 37/02 | (2006.01) |
| H04L 12/28 | (2006.01) |

(52) U.S. Cl.
CPC ..... *H05B 33/0851* (2013.01); *H05B 33/0809* (2013.01); *H05B 33/0842* (2013.01);
(Continued)

(58) Field of Classification Search
CPC ............ H05B 33/0851; H05B 33/0809; H05B 37/0272
(Continued)

(56) References Cited

U.S. PATENT DOCUMENTS

| 9,410,664 B2* | 8/2016 | Krames .............. H05B 37/0281 |
| 9,655,217 B2* | 5/2017 | Recker ............... H05B 37/0272 |

(Continued)

FOREIGN PATENT DOCUMENTS

| CN | 101448351 A | 6/2009 |
| CN | 103491676 A * | 1/2014 |

(Continued)

OTHER PUBLICATIONS

International Search report (and its English translation) dated Jan. 19, 2016 for PCT application No. PCT/CN2015/093426 filed Oct. 30, 2015 (published as WO2016/066138 on May 6, 2016) which is the parent application to the instant application, 5 pages.

*Primary Examiner* — Dylan White
(74) *Attorney, Agent, or Firm* — Harness, Dickey & Pierce, PLC; Anthony Fussner

(57) ABSTRACT

A low-voltage DC lighting system with identification addresses, comprising a smart controller, a terminal controller, a plurality of digital control switches connected with a low-voltage DC power supply through the terminal controller and controlled by the terminal controller and low-voltage DC lamps connected with each of the digital control switches respectively, each one of the smart controller and the terminal controller has a unique code, a storage space and an own CPU respectively, the terminal controller has a network interface connected to the smart controller, and the terminal controller exchanges information with the smart controller through the network interface, the smart controllers are also connected with each other via network interfaces, and the smart controller stores the identification addresses of every low-voltage DC lamps controlled by the terminal controller; the terminal controller comprises a network information receiving and transmitting module, a terminal calculating module and a lighting industrial control module. Accordingly, the smart controller can perform vari-
(Continued)

ous controls over the low-voltage DC lamps located at different locations through the terminal controller according to the identification addresses of the low-voltage DC lamps.

9 Claims, 1 Drawing Sheet

(52) U.S. Cl.
CPC ..... *H05B 37/0245* (2013.01); *H05B 37/0272* (2013.01); *H04L 12/2803* (2013.01); *Y02B 20/40* (2013.01); *Y02B 20/48* (2013.01)

(58) Field of Classification Search
USPC .......................................................... 315/151
See application file for complete search history.

(56) References Cited

U.S. PATENT DOCUMENTS

| | | | |
|---|---|---|---|
| 2014/0225514 A1* | 8/2014 | Pickard | H05B 33/0857 |
| | | | 315/152 |
| 2016/0183351 A1* | 6/2016 | Snyder | H04L 12/10 |
| | | | 315/152 |
| 2017/0231053 A1* | 8/2017 | Underwood | G06T 7/20 |

FOREIGN PATENT DOCUMENTS

| | | | |
|---|---|---|---|
| CN | 103491676 A | | 1/2014 |
| CN | 103561513 A | * | 2/2014 |
| CN | 103561513 B | | 2/2014 |
| CN | 103596326 A | | 2/2014 |
| CN | 203691677 U | | 7/2014 |

\* cited by examiner

LOW VOLTAGE DIRECT CURRENT LIGHTING SYSTEM HAVING IDENTIFICATION ADDRESSES

This patent application is a U.S. national stage filing under 35 U.S.C. § 371 of International Application No. PCT/CN2015/093426 filed Oct. 30, 2015, which claims priority of Chinese Application No. 201410596689.9 filed Oct. 30, 2014. The disclosures of the applications identified in this paragraph are incorporated herein by reference in their entirety.

TECHNICAL FIELD

The present invention relates to a lighting system, in particular a lighting system with identification addresses.

BACKGROUND OF THE INVENTION

For existing office and home lighting systems, since the lamps such as fluorescent lamps powered by 220V or other commercial power supplies are being widely used, the operations of arranging and connecting wires for the lighting systems are required to be performed by electricians having a practice license. Thus, the labor costs of the professionals of the lighting system are the costs that must be considered. For office or home, once the lighting system is installed, you can no longer modify the wiring without the help of electricians. Therefore, in case that there is a need to re-decorate the home or office circumstances, people have to rely on professional electricians to deal with again. So the arranging and connecting of wires of lighting system can not be finished by ordinary people just like the arranging and connecting of wires of a computer network system, without having to rely on professionals. And its installation and maintenance must rely on professionals. This gives people living and work inconvenience.

Due to the high efficiency and energy saving of LED lamps, people increasingly hope that they could be used in general lighting systems for lighting and not just for decoration. For example, Chinese patent CN200720125254.1 discloses an LED indoor lighting control system. In this system, the mains AC current is regulated by a switching regulated power supply circuit as a low-voltage DC current. The low-voltage DC current is connected to a LED lamp load via an output control circuit. A single-chip controller is connected to the switching stabilized voltage power supply circuit and the output control circuit, respectively, to integrally control the LED illumination. However, because the control over the LEDs is a control over electronic switches connected to LEDs by means of the single-chip controller, the number of the LEDs under the control of the single-chip controller is very limited, so that only a part of the LEDs can be collectively controlled and the individual control over a large number of LED lamps can not be implemented.

BRIEF SUMMARY OF THE INVENTION

The invention solves the technical problem that the existing lighting system can not control the low-voltage DC lamps respectively, and provides a low-voltage DC lighting system with identification addresses, which can realize the respective control of each low-voltage DC lamp so as to maximize control capabilities.

The technical solution of the present invention is as follows: a low-voltage DC lighting system with identification addresses, comprising a smart controller, a terminal controller, a plurality of digital control switches connected with a low-voltage DC power supply through the terminal controller and controlled by the terminal controller and low-voltage DC lamps connected with each of the digital control switches respectively. Each one of the smart controller and the terminal controller has a unique code, a storage space and an own CPU respectively. The terminal controller has a network interface connected to the smart controller. The terminal controller exchanges information with the smart controller through the network interface. The smart controllers are also connected with each other via network interfaces. The smart controller stores the identification addresses of every low-voltage DC lamps controlled by the terminal controller. The terminal controller comprises a network information receiving and transmitting module, a terminal calculating module and a lighting industrial control module. The terminal calculating module stores the identification addresses of every low-voltage DC lamps. The network information receiving and transmitting module receives the control information from the smart controller and transmits it to the terminal calculating module. The terminal calculating module transmits the control information to the lighting industrial control module according to the identification address. The digital control switch of the corresponding low-voltage DC lamp is controlled by the lighting industrial control module. The terminal calculating module also transmits the status of the low-voltage DC lamp connected to the terminal controller through the network information receiving and transmitting module to the smart controller.

The digital control switch is a digital dimmer switch and the lighting industrial control module also controls the brightness of the low-voltage DC lamp through the digital dimmer switch.

It further comprises an application photoreceptor having an identification address, connected to the terminal controller and used for sensing the light intensity of the low-voltage DC lamp connected to the terminal controller, wherein the terminal controller also includes a photometric industrial control module, which is connected to the terminal calculating module and the application photoreceptor respectively, and which reads the photosensitive value of the corresponding application photoreceptor according to the control information of the terminal calculating module and transfers the photosensitive value to the terminal calculating module which transfers the photosensitive value of the application photoreceptor to the smart controller through the network information receiving and transmitting module, wherein the smart controller and the terminal controller store the identification addresses of the respective application photoreceptors.

A signal detector is also connected between the photometric industrial control module and the application photoreceptor.

The unique code is a MAC address, and the network interface is a network interface supporting the transmission of data link layer.

The identification addresses are IP addresses.

There are a plurality of terminal controllers, and the IP address is a three-level IP address, that is, a smart controller, a terminal controller, and a low-voltage DC lamp.

The low-voltage DC lamp is an LED lamp.

The LED lamp is equipped with a rectifier circuit and a flow measurement drive circuit and connected to the terminal controller after R/D conversion, respectively.

The smart controller comprises a first-level smart controller and a second-level smart controller, wherein the second-level smart controller is mounted on the upper surface of the ceiling, the LED lamp is provided on the ceiling on which the second-level smart controller is mounted, and the application photoreceptor is provided on the lower surface of the ceiling on which the second-level smart controller is mounted.

In the invention, the low-voltage DC lamp is directly connected to the terminal controllers with the identification addresses. The terminal controllers are connected to the smart controller which also stores the identification addresses of the low-voltage DC lamps through the network interface. Thus, when the low-voltage DC lamps located at different locations are connected with the terminal controller, because the identification addresses of every low-voltage DC lamps are stored in the terminal calculating module of the terminal controller, the terminal calculating module transfers the control command to the lighting industrial control module according to the identification addresses. The lighting industrial control module controls the switches of the corresponding Low-voltage DC lamps. Accordingly, the smart controller can perform various controls over the low-voltage DC lamps located at different locations through the terminal controller according to the identification addresses of the low-voltage DC lamps. According to the present invention, the plurality of smart controllers and the plurality of terminal controllers can be connected via network to form a large network control system, so as to realize the respective control of a plurality of low-voltage DC lamps such as LEDs.

The providing of the application photoreceptor and the photometric industrial control module allows the present invention to adjust the lighting state of the system according to the environment and needs.

The unique code which is a MAC address and the IP address allow the present invention to have different levels of network communication functions.

Using an IP address as the unique code makes it easy for the computer to use existing system software for control.

The LED lamp which is selected by the applicant is the light having the best brightness among the low-voltage DC lamps, which is easy to be used for home and office lighting.

The LED lamp is equipped with a rectifier circuit and a flow measurement drive circuit, so as to control its brightness easily.

Providing two level controllers makes it easy to control more low-voltage DC lamps.

DETAILED DESCRIPTION OF THE INVENTION

Figure 1:
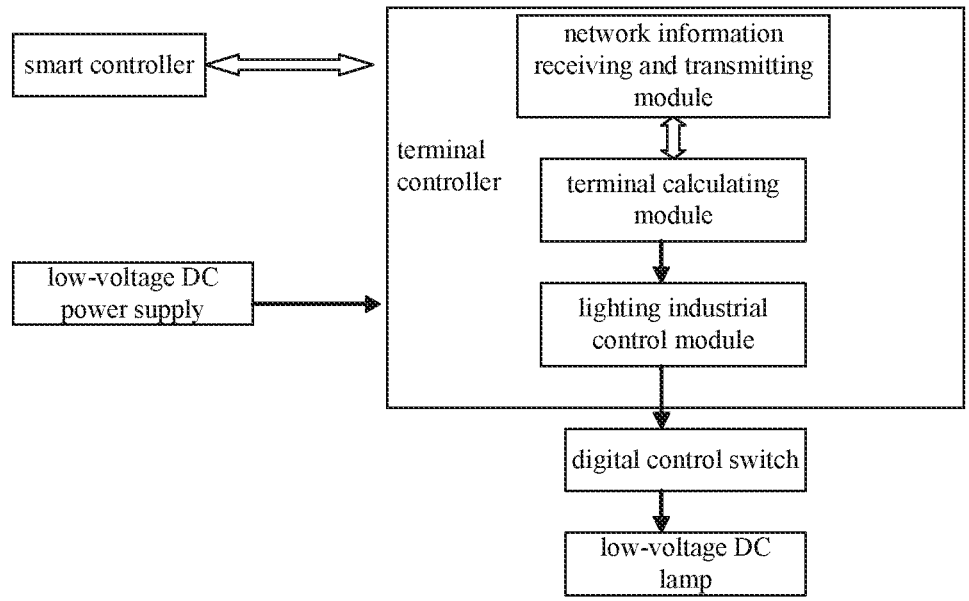
FIG. 1 is a structural block diagram of the present invention.

Referring to FIG. 1, the invention will now be described further with reference to the accompanying drawings.

The low-voltage DC lighting system with identification addresses comprises a smart controller, a terminal controller, a plurality of digital control switches connected with a low-voltage DC power supply through the terminal controller and controlled by the terminal controller, and low-voltage DC lamps, such as LED lights, connected with each of the digital control switches respectively. Each one of the smart controller and the terminal controller has a unique code, a storage space and an own CPU respectively. The terminal controller has a network interface connected to the smart controller. The terminal controller exchanges information with the smart controller through the network interface. The smart controllers are also connected with each other via network interfaces. The smart controller stores the identification addresses of every low-voltage DC lamps controlled by the terminal controller. The terminal controller comprises a network information receiving and transmitting module, a terminal calculating module and a lighting industrial control module. The terminal calculating module stores the identification addresses of every low-voltage DC lamps. The network information receiving and transmitting module receives the control information from the smart controller and transmits it to the terminal calculating module. The terminal calculating module transmits the control information to the lighting industrial control module according to the identification address. The digital control switch of the corresponding low-voltage DC lamp is controlled by the lighting industrial control module. The terminal calculating module also transmits the status of the low-voltage DC lamp connected to the terminal controller through the network information receiving and transmitting module to the smart controller.

Preferably, the digital control switch is a digital dimmer switch. The lighting industrial control module also controls the brightness of the low-voltage DC lamp through the digital dimmer switch. The smart controller sends control information to the terminal controller as needed. The terminal controller controls the lighting brightness of the low-voltage DC lamps with identification addresses to obtain the lighting state of best energy saving.

Figure 2:
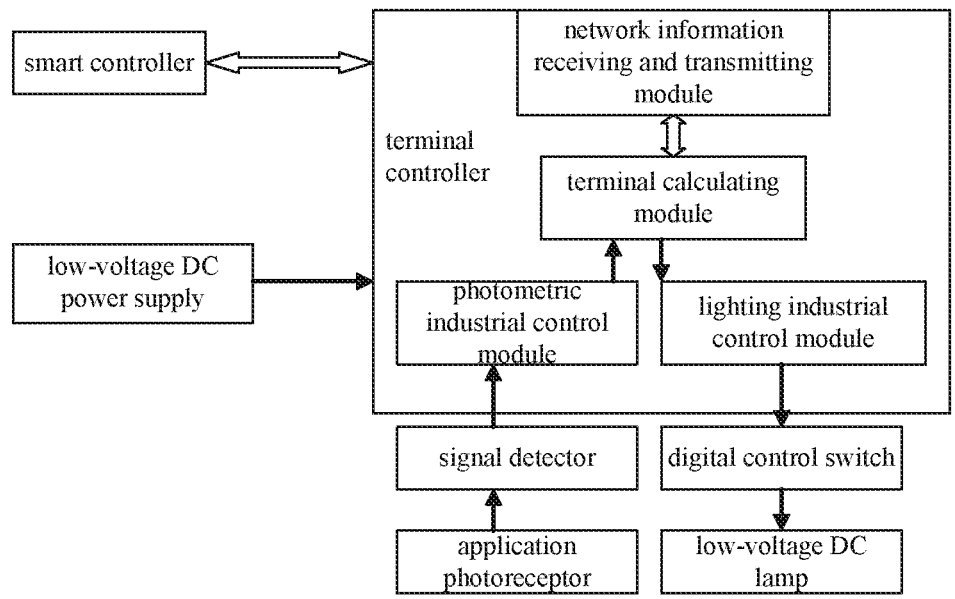
FIG. 2 is a structural block diagram of an embodiment according to the present invention in which the photometric module is provided.

Referring to FIG. 2, the low-voltage DC lighting system further comprises an application photoreceptor connected to the terminal controller having identification addresses and used for sensing the light intensity of the low-voltage DC lamp connected to the terminal controller. The terminal controller also includes a photometric industrial control module, which is connected to the terminal calculating module and the application photoreceptor respectively, and which reads the photosensitive value of the corresponding application photoreceptor according to the control information of the terminal calculating module and transfers the photosensitive value to the terminal calculating module which transfers the photosensitive value of the application photoreceptor to the smart controller through the network information receiving and transmitting module. The smart controller and the terminal controller store the identification addresses of the respective application photoreceptors. Thus, the smart controller can monitor the environment where the application photoreceptor is located, i.e., the brightness state of the surrounding low-voltage DC lamps around the application photoreceptor. Then the smart controller can change the brightness of the low-voltage DC lamps with the identification addresses according to the design requirement and the application requirement, so as to obtain the lighting brightness environment meeting the design requirement and the application requirement.

A signal detector is also connected between the photometric industrial control module and the application photoreceptor.

The unique code of the low-voltage DC lamp and the application photoreceptor may be a MAC address. The network interface is a network interface supporting the transmission of data link layer. Preferably, the identification addresses are IP addresses. More preferably, there are a plurality of terminal controllers. And the IP address is a three-level IP address, that is, a smart controller, a terminal controller, and a low-voltage DC lamp. The IP address may be a four-level IP address, for example, there are a plurality of smart controllers. The smart controller can be set into two-level smart controllers, comprising a first-level smart controller and a second-level smart controller. The second-level smart controller is mounted on the upper surface of the ceiling. The low-voltage DC lamps are provided on the ceiling on which the second-level smart controller is mounted. The application photoreceptor is provided on the lower surface of the ceiling on which the second-level smart controller is mounted. Thus, the IP address becomes a four-level IP address.

When the low-voltage DC lamp is an LED lamp, the LED lamp is equipped with a rectifier circuit and a flow measurement drive circuit and connected to the terminal controller after R/D conversion, respectively.

The invention claimed is:

1. A low-voltage DC lighting system with identification addresses, comprising a smart controller, a terminal controller, a plurality of digital control switches connected with a low-voltage DC power supply through the terminal controller and controlled by the terminal controller and low-voltage DC lamps connected with each of the digital control switches respectively, the terminal controller has a network interface connected to the smart controller, and the terminal controller exchanges information with the smart controller through the network interface, and the smart controller stores the identification addresses of every low-voltage DC lamps controlled by the terminal controller; the terminal controller comprises a network information receiving and transmitting module, a terminal calculating module and a lighting industrial control module, the terminal calculating module stores the identification addresses of every low-voltage DC lamps, the network information receiving and transmitting module receives the control information from the smart controller and transmits it to the terminal calculating module, the terminal calculating module transmits the control information to the lighting industrial control module according to the identification address, the digital control switch of the corresponding low-voltage DC lamp is controlled by the lighting industrial control module; the terminal calculating module also transmits the status of the low-voltage DC lamp connected to the terminal controller through the network information receiving and transmitting module to the smart controller; wherein the low-voltage DC lighting system with identification addresses further comprises an application photoreceptor having an identification address, connected to the terminal controller and used for sensing the light intensity of the low-voltage DC lamp connected to the terminal controller, wherein the terminal controller also includes a photometric industrial control module, which is connected to the terminal calculating module and the application photoreceptor respectively, and which reads the photosensitive value of the corresponding application photoreceptor according to the control information of the terminal calculating module and transfers the photosensitive value to the terminal calculating module which transfers the photosensitive value of the application photoreceptor to the smart controller through the network information receiving and transmitting module, wherein the smart controller and the terminal controller store the identification addresses of the respective application photoreceptors.

2. The low-voltage DC lighting system with identification addresses according to claim 1, wherein the digital control switch is a digital dimmer switch and the lighting industrial control module also controls the brightness of the low-voltage DC lamp through the digital dimmer switch.

3. The low-voltage DC lighting system with identification addresses according to claim 1, wherein a signal detector is also connected between the photometric industrial control module and the application photoreceptor.

4. The low-voltage DC lighting system with identification addresses according to claim 1, wherein the network interface is a network interface supporting the transmission of data link layer.

5. The low-voltage DC lighting system with identification addresses according to claim 4, wherein the identification addresses are IP addresses.

6. The low-voltage DC lighting system with identification addresses according to claim 5, wherein there are a plurality of terminal controllers, and the IP address is a three-level IP address, that is, a smart controller, a terminal controller, and a low-voltage DC lamp.

7. The low-voltage DC lighting system with identification addresses according to claim 6, wherein the low-voltage DC lamp is an LED lamp.

8. The low-voltage DC lighting system with identification addresses according to claim 7, wherein the LED lamp is equipped with a rectifier circuit and a flow measurement drive circuit and connected to the terminal controller after R/D conversion, respectively.

9. The low-voltage DC lighting system with identification addresses according to claim 7, wherein the smart controller comprises a first-level smart controller and a second-level smart controller, wherein the second-level smart controller is mounted on the upper surface of the ceiling, the LED lamp is provided on the ceiling on which the second-level smart controller is mounted, and the application photoreceptor is provided on the lower surface of the ceiling on which the second-level smart controller is mounted.

* * * * *